(12) United States Patent
Ohiso (10) Patent No.: US 12,163,578 B2
(45) Date of Patent: Dec. 10, 2024

(54) VEHICLE DRIVING APPARATUS

(71) Applicant: HONDA MOTOR CO., LTD., Tokyo (JP)

(72) Inventor: Keiichi Ohiso, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/129,550

(22) Filed: Mar. 31, 2023

(65) Prior Publication Data

US 2024/0328493 A1  Oct. 3, 2024

(51) Int. Cl.
| *F16H 41/28* | (2006.01) |
| *F01M 1/02* | (2006.01) |
| *F04C 2/10* | (2006.01) |
| *F16H 57/04* | (2010.01) |

(52) U.S. Cl.
CPC ............... *F16H 41/28* (2013.01); *F04C 2/10* (2013.01); *F16H 57/0436* (2013.01); *F01M 2001/0284* (2013.01)

(58) Field of Classification Search
CPC ............ F16H 57/0476; F16H 57/0434; F16H 57/0436; F16H 41/28; F01M 2001/0207; F01M 2001/0253; F04C 2210/14
See application file for complete search history.

(56) References Cited

U.S. PATENT DOCUMENTS

| 5,158,152 A * | 10/1992 | Nemoto ................... F16N 7/40 |
| | | 184/6.12 |
| 5,901,802 A * | 5/1999 | Sunohara ............ F16H 57/0434 |
| | | 184/6.12 |
| 7,350,605 B2 * | 4/2008 | Mizutani .............. B60K 17/046 |
| | | 180/65.6 |
| 2020/0292054 A1 * | 9/2020 | Kawanishi .......... F16H 57/0404 |

FOREIGN PATENT DOCUMENTS

JP      2009-068408 A      4/2009

* cited by examiner

*Primary Examiner* — Justin D Seabe
*Assistant Examiner* — Michael K. Reitz
(74) *Attorney, Agent, or Firm* — Paratus Law Group, PLLC (57) ABSTRACT

A vehicle driving apparatus includes a rotating shaft driven by the power source, a fluid pump driven by the rotating shaft. The fluid pump includes a rotor rotated by the rotating shaft, and a case. The case includes a fluid discharge port provided on an inner peripheral surface of an insertion hole through which the rotating shaft is inserted. The rotating shaft includes an attachment portion fittable to a shaft hole, and an internal flow path. A supply groove communicating with the internal flow path is provided on an outer peripheral surface of the rotating shaft. The fluid pump is attached to the attachment portion of the rotating shaft such that positions of the discharge port and the supply groove in an axial direction of the rotating shaft overlap each other. The attachment portion is provided on each of both sides of the supply groove in the axial direction.

8 Claims, 11 Drawing Sheets

VEHICLE DRIVING APPARATUS

TECHNICAL FIELD

The present invention relates to a vehicle driving apparatus.

BACKGROUND ART

A vehicle includes auxiliary devices such as a water pump that circulates cooling water for cooling an engine or the like which is a power source, and an oil pump that circulates hydraulic oil for operating an automatic transmission or the like, or lubricating oil for lubricating each part. These auxiliary devices are driven by an engine, or driven by an electric motor provided separately from the engine.

A pump device described in JP2009-68408A includes a coupling unit between an oil pump and an electric motor, and the coupling unit can couple the oil pump to the electric motor positioned on a vehicle body at any angle in a circumferential direction. The coupling unit can direct a pipe attachment portion of the oil pump toward the pipe regardless of the position of the electric motor. Accordingly, the pump device can be used in common for a plurality of vehicle types having different attachment spaces for the pump device.

An aspect of the present disclosure further improves the versatility of a vehicle driving apparatus including a fluid pump.

SUMMARY OF INVENTION

According to an aspect of the present disclosure, the is provided a vehicle driving apparatus that includes a power source, a rotating shaft driven by the power source, a fluid pump driven by the rotating shaft, and a housing accommodating the power source, the rotating shaft, and the fluid pump. The fluid pump includes a rotor that includes a shaft hole through which the rotating shaft is to be inserted and that is rotated by the rotating shaft inserted through the shaft hole, and a case that accommodates the rotor and includes an insertion hole which is a hole continuous with the shaft hole of the rotor and through which the rotating shaft is to be inserted. The case includes a discharge port configured to allow a fluid to be discharged therethrough, and the discharge port is provided on an inner peripheral surface of the insertion hole. The rotating shaft includes an attachment portion fittable to the shaft hole, and an internal flow path configured to allow the fluid to flow therethrough. A supply groove is provided on an outer peripheral surface of the rotating shaft, and the supply groove communicates with the internal flow path. The fluid pump is attached to the attachment portion of the rotating shaft such that positions of the discharge port and the supply groove in an axial direction of the rotating shaft overlap each other. The attachment portion is provided on each of both sides of the supply groove in the axial direction.

DESCRIPTION OF EMBODIMENTS

Figure 1:
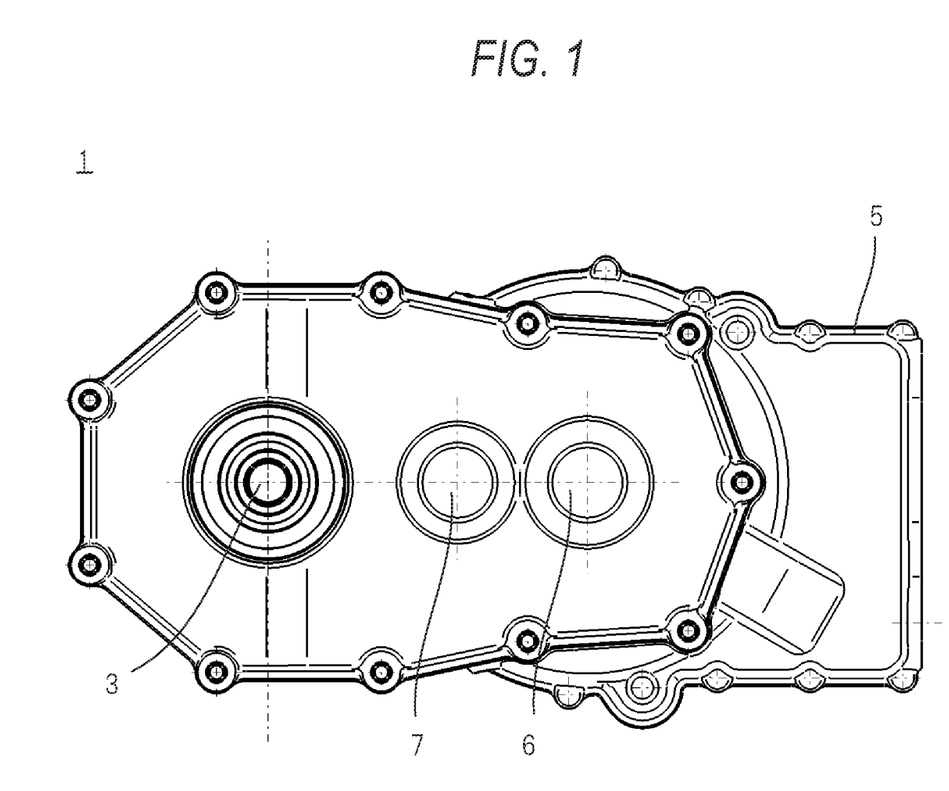
FIG. 1 is a view showing an example of a vehicle driving apparatus, which illustrates an embodiment of the present invention.
Figure 2:
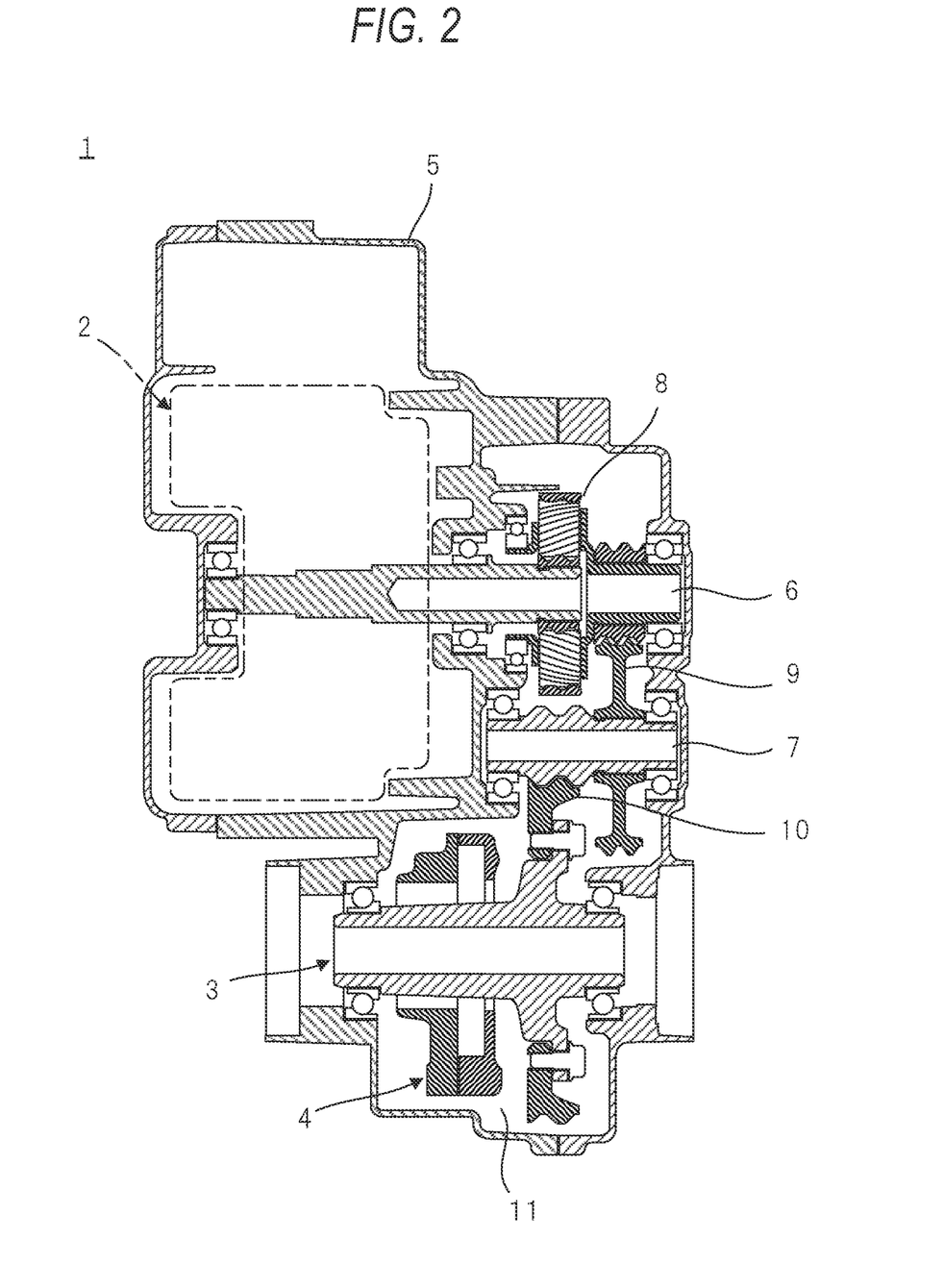
FIG. 2 is a cross-sectional view of the vehicle driving apparatus in FIG. 1.

FIGS. 1 and 2 show an example of a vehicle driving apparatus.

A vehicle driving apparatus 1 shown in FIGS. 1 and 2 is mounted on a work vehicle such as a lawn mower, and includes a power source for driving wheels of the vehicle, and a fluid pump driven by the power source. In this type of work vehicle, a mounting posture of the driving apparatus varies depending on the type and purpose of the work vehicle. The vehicle driving apparatus 1 can be commonly applied to different mounting postures because the assembly of the fluid pump can be changed according to the mounting posture to the vehicle.

The vehicle driving apparatus 1 includes an electric motor 2 as a power source, a rotating shaft 3 driven by the electric motor 2, an oil pump 4 as a fluid pump, and a housing 5. The housing 5 accommodates the electric motor 2, the rotating shaft 3, and the oil pump 4. The power source may be an internal combustion engine, and the fluid pump may be a water pump for circulating cooling water.

The rotation output from the electric motor 2 is transmitted to the rotating shaft 3 via the intermediate transmission shafts 6 and 7. The rotation transmitted to the rotating shaft 3 is appropriately decelerated via a planetary gear mechanism 8 provided between the electric motor 2 and the intermediate transmission shaft 6, and gear mechanisms 9 and 10 respectively provided between the intermediate transmission shaft 6 and the intermediate transmission shaft 7 and between the intermediate transmission shaft 7 and the rotating shaft 3.

The rotating shaft 3 penetrates the oil pump 4. The oil pump 4 is attached to an intermediate portion of the rotating shaft 3 and is driven by the rotating shaft 3. The oil pump 4 sucks oil accumulated in a lower portion of a pump accommodating portion 11 of the housing 5 and sends out the sucked oil. The oil sent out from the oil pump 4 is introduced into an internal flow path formed inside the rotating shaft 3, and is supplied to each part of the vehicle driving apparatus 1 through the internal flow path.

Figure 3:
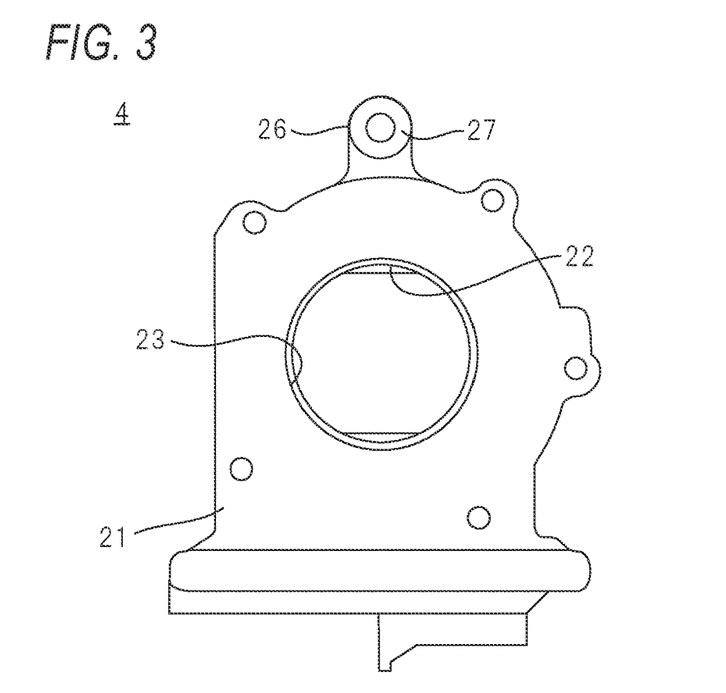
FIG. 3 is a view showing a fluid pump of the vehicle driving apparatus in FIG. 1.
Figure 4:
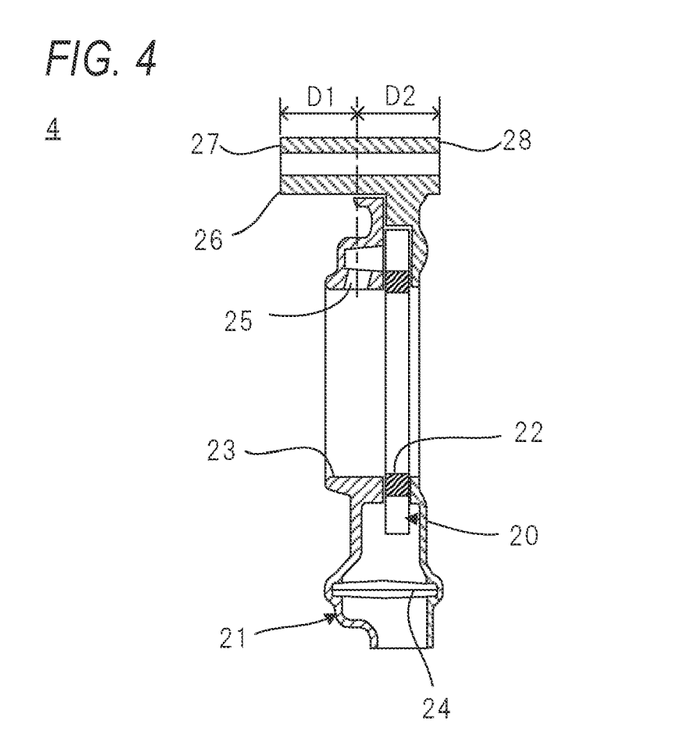
FIG. 4 is a cross-sectional view of the fluid pump in FIG. 3.

FIGS. 3 and 4 show the oil pump 4.

The oil pump 4 is a rotary pump that is a type of a positive-displacement pump, and includes a rotor 20 that is rotated by the rotating shaft 3. The oil pump 4 further includes a case 21 that accommodates the rotor 20. The rotor 20 includes a shaft hole 22 through which the rotating shaft 3 is to be inserted, and the case 21 includes an insertion hole 23 which is a hole continuous with the shaft hole 22 of the rotor 20 and through which the rotating shaft 3 is to be inserted.

The oil pump 4 sucks oil by rotation of the rotor 20, and sends out the sucked oil. A strainer 24 for sucking oil is provided at a lower portion of the case 21. A discharge port 25 through which the oil sent out from the rotor 20 is discharged is provided at an upper portion of the case 21. The discharge port 25 is provided in an inner peripheral surface of the insertion hole 23 of the case 21.

The case 21 includes a case-side fixing portion 26 to be fixed to the housing 5. The case 21 fixed to the housing 5 by the case-side fixing portion 26 is prevented from rotating about the rotating shaft 3. The case-side fixing portion 26 is provided at an upper end portion of the case 21 in the example shown in FIGS. 3 and 4, and the position of the case-side fixing portion 26 can be appropriately set.

The case-side fixing portion 26 is formed in a columnar shape extending in an axial direction of the insertion hole 23. The case-side fixing portion 26 has a first end surface 27 on one side and a second end surface 28 on the other side in the axial direction. The discharge port 25 is provided in a central portion between the first end surface 27 and the second end surface 28 in the axial direction. A distance D1 from the first end surface 27 to a center of the discharge port 25 along the axial direction is preferably equal to a distance D2 from the second end surface 28 to the center of the discharge port 25 along the axial direction. Here, in the present disclosure, even if the distance D1 and the distance D2 do not strictly coincide with each other, the distance D1 and the distance D2 are regarded to be "equal" as long as the difference therebetween is within a range of an allowable error such as a manufacturing error or a measurement error.

Figure 5:
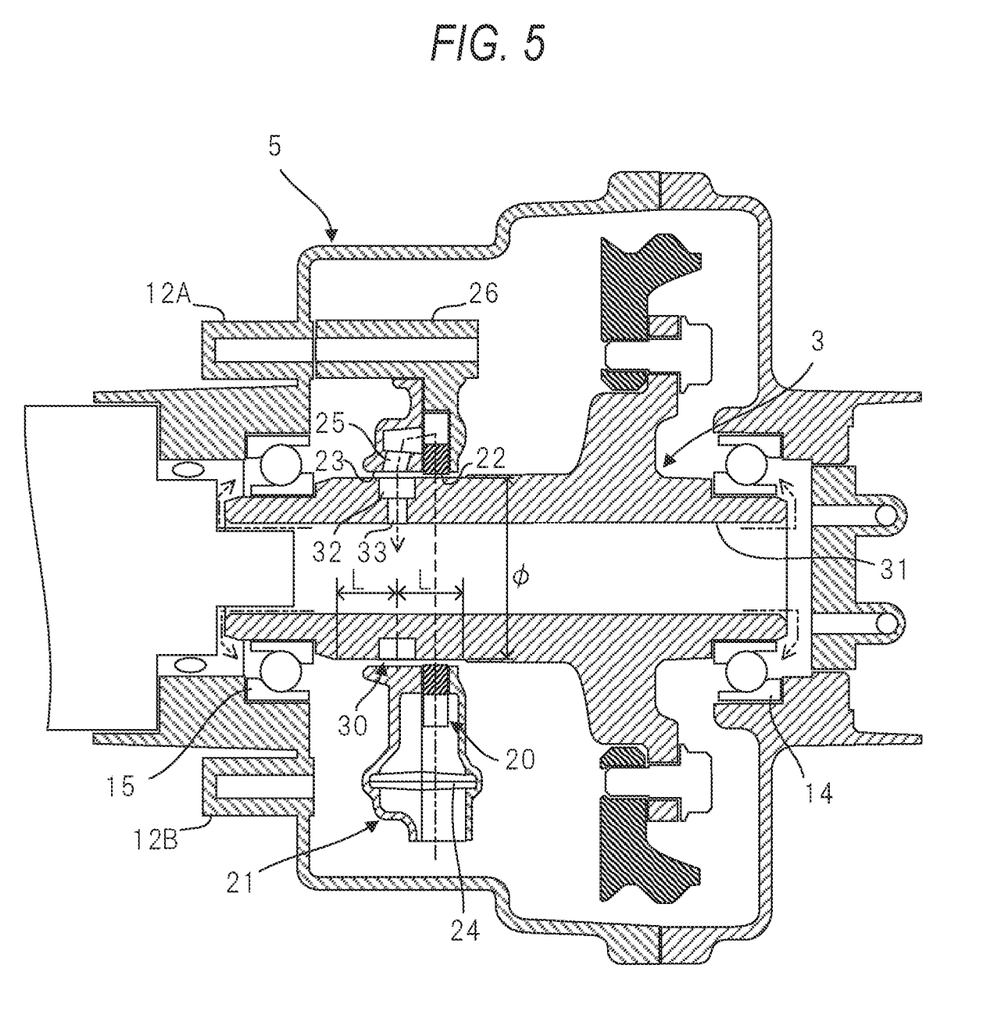
FIG. 5 is a view showing a rotating shaft of the vehicle driving apparatus in FIG. 1.

FIG. 5 shows the rotating shaft 3.

The rotating shaft 3 includes an attachment portion 30 to which the oil pump 4 is to be attached, and an internal flow path 31 through which the oil sent out from the oil pump 4 flows. The attachment portion 30 is fitted inside the shaft hole 22 of the rotor 20, and the rotating shaft 3 and the rotor 20 rotate integrally. The attachment portion 30 is further fitted into the insertion hole 23 of the case 21, and an inner diameter of the insertion hole 23 is slightly larger than an inner diameter of the shaft hole 22, and the rotating shaft 3 and the case 21 are rotatable relative to each other. An outer peripheral surface of the attachment portion 30 is provided with an annular supply groove 32 around the outer peripheral surface. The supply groove 32 communicates with the internal flow path 31 via a communication hole 33.

The oil pump 4 is attached to the attachment portion 30 such that the discharge port 25 of the case 21 and the supply groove 32 overlap each other at a position in the axial direction of the rotating shaft 3. As indicated by a two-dot chain line in FIG. 5, the oil discharged from the discharge port 25 flows into the supply groove 32 and then is introduced into the internal flow path 31 through the communication hole 33. The oil introduced into the internal flow path 31 is supplied to, for example, bearings 14 and 15, which rotatably support the rotating shaft 3, through the internal flow path 31 and an external flow path connected thereto.

The width of the supply groove 32 along the axial direction is preferably larger than the width of the discharge port 25 along the axial direction. Accordingly, even in a case where the center of the discharge port 25 is shifted in the axial direction relative to a center of the supply groove 32 due to a manufacturing error or the like, the oil discharged from the discharge port 25 can smoothly and reliably flow into the supply groove 32.

The attachment portion 30 is provided on both sides of the supply groove 32 in the axial direction with the supply groove 32 as a center. The attachment portion 30 is preferably formed symmetrically in the axial direction with the supply groove 32 as a center. In other words, as shown in FIG. 5, in a state where the oil pump 4 is attached to the attachment portion 30 and the discharge port 25 and the supply groove 32 overlap each other, in a case where a larger one of a distance from the supply groove 32 to an opening on one side of the insertion hole 23 and a distance from the supply groove 32 to an opening on the other side of the insertion hole 23 is defined as L, a portion having an outer diameter φ that can be fitted into the shaft hole 22 and the insertion hole 23 is provided on each of both sides of the supply groove 32 over the distance L at least.

The operation of the vehicle driving apparatus 1 configured as described above will be described with reference to FIGS. 6 to 8.

Figure 6:
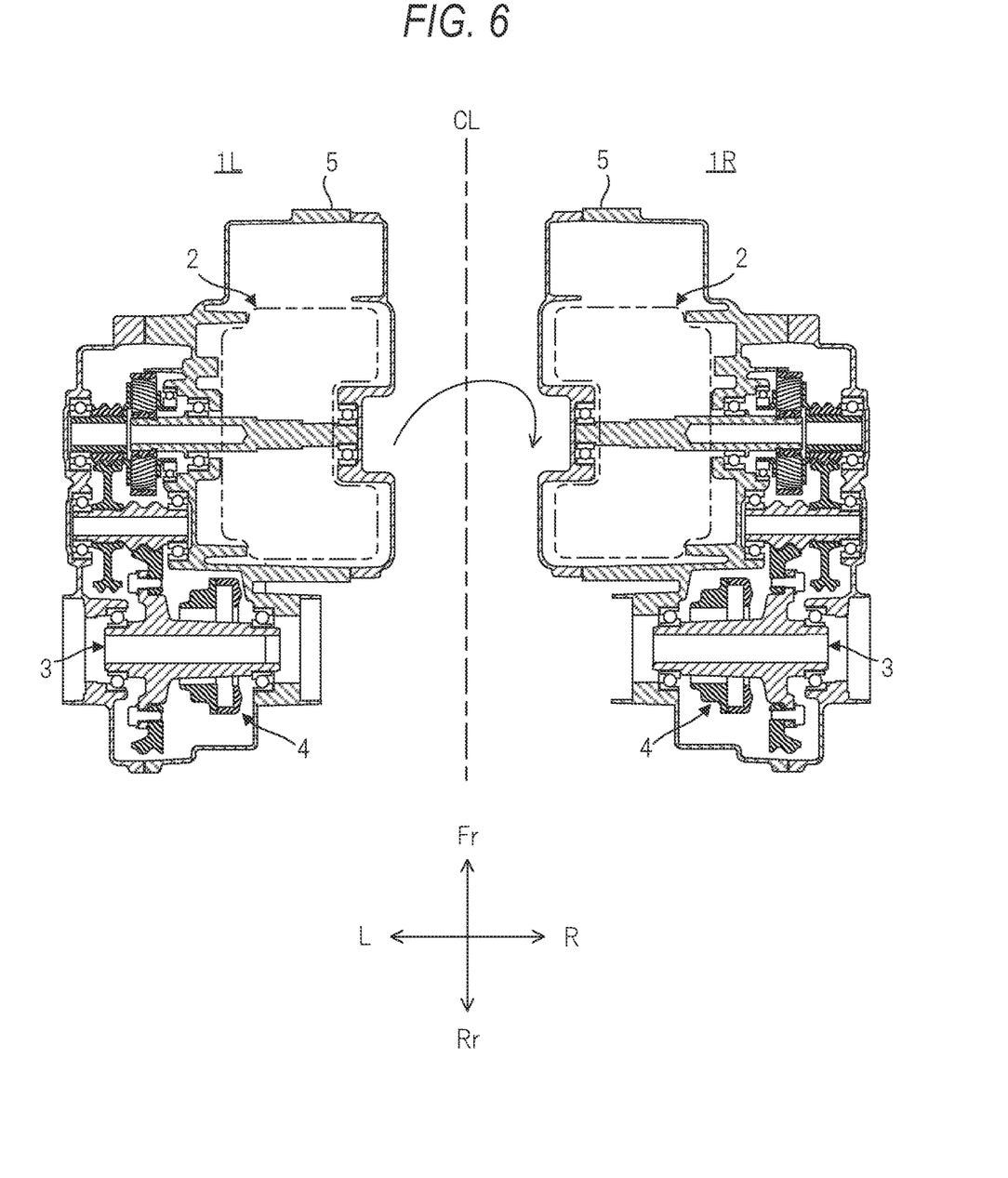
FIG. 6 is a conceptual diagram illustrating an operation of the vehicle driving apparatus in FIG. 1.

As shown in FIG. 6, arrangements are adopted in which the vehicle driving apparatus 1 may be rotated by 180° about a center line CL of the vehicle extending in, for example, a front-rear direction (Fr-Rr) of the vehicle so that the entire device is vertically reversed (hereinafter, referred to as vertically reversed), and the devices are arranged in the left-right direction. For example, left wheels of the vehicle can be driven by a left vehicle driving apparatus 1L, and right wheels of the vehicle can be driven by the right vehicle driving apparatus 1R. In this case, a rotation direction of the rotating shaft 3 of the left vehicle driving apparatus 1L during forward movement and a rotation direction of the rotating shaft 3 of the right vehicle driving apparatus 1R during forward movement are opposite to each other That is, the rotation direction during forward movement when the left vehicle driving apparatus 1L is viewed from the center line CL is clockwise, and the rotation direction during forward movement when the right vehicle driving apparatus 1R is viewed from the center line CL is counterclockwise. Here, in a case where the oil pump 4 (the rotor 20 of the oil pump 4) is capable of sucking and sending out the oil only by rotation in one direction, the first end surface 27 and the second end surface 28 of the oil pump 4 are reversed and mounted on the housing 5, or the vehicle driving apparatus 1 is vertically reversed except for the oil pump 4 when the vehicle driving apparatus 1 is vertically reversed, so that the oil can be sucked and sent in both the left vehicle driving apparatus 1L and the right vehicle driving apparatus 1R. At this time, regardless of whether the vehicle driving apparatus 1 is vertically reversed, the oil pump 4 is disposed inside the housing 5 such that the strainer 24 faces downward.

Figure 7:
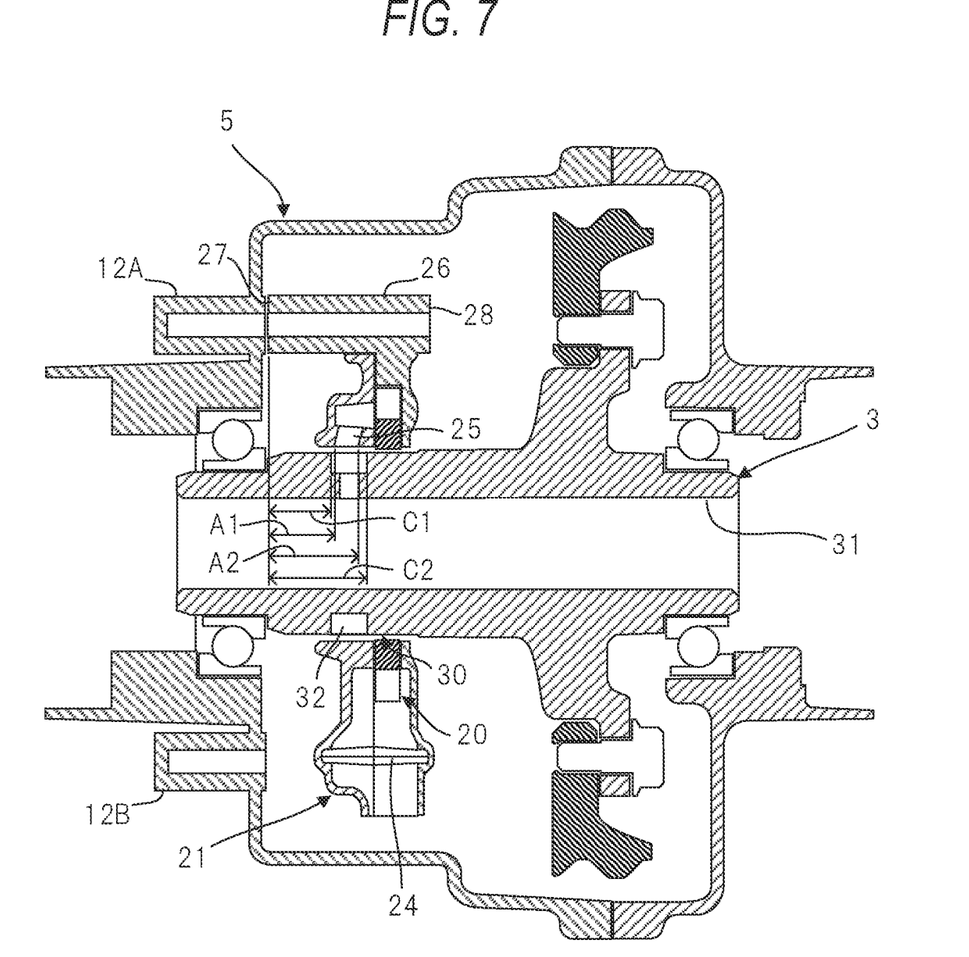
FIG. 7 is a cross-sectional view showing an example of attachment of the fluid pump in the vehicle driving apparatus in FIG. 1.
Figure 8:
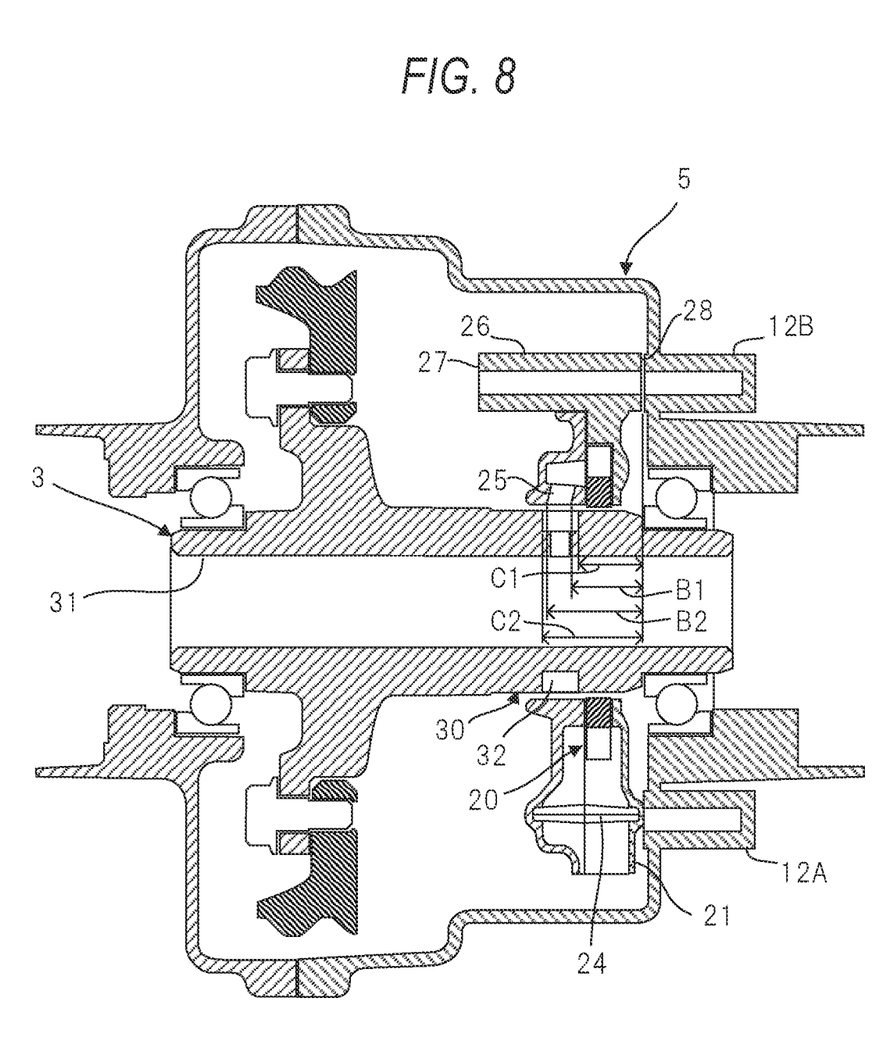
FIG. 8 is a sectional view showing another example of the attachment of the fluid pump in the vehicle driving apparatus in FIG. 1.

FIG. 7 shows one arrangement (the right vehicle driving apparatus 1R that drives the wheels on the right side of the vehicle) of the vertically reversed arrangements of the vehicle driving apparatus 1, and FIG. 8 shows the other arrangement (the left vehicle driving apparatus 1L that drives the wheels on the left side of the vehicle) of the vertically reversed arrangements.

In an arrangement shown in FIG. 7, the first end surface 27 of the case-side fixing portion 26 of the oil pump 4 abuts against a fixing boss 12A of a housing-side fixing portion provided in the housing 5, and is fixed to the fixing boss 12A using a bolt or the like. On the other hand, in an arrangement shown in FIG. 8, the second end surface 28 of the case-side fixing portion 26 of the oil pump 4 abuts against a fixing boss 12B of the housing-side fixing portion, and is fixed to the fixing boss 12B using a bolt or the like. The fixing boss 12A and the fixing boss 12B are provided symmetrically in the up-down direction with respect to the rotating shaft 3. Between the arrangement shown in FIG. 7 and the arrangement shown in FIG. 8, the vehicle driving apparatus 1 is vertically reversed except for the oil pump 4, and thus is arranged symmetrically in the left-right direction.

The attachment portion 30 of the rotating shaft 3 is provided on both sides of the supply groove 32 in the axial direction with the supply groove 32 as the center, so that the oil pump 4 can be attached to the rotating shaft 3 disposed symmetrically in the left-right direction such that the discharge port 25 overlaps the supply groove 32 and the strainer 24 faces downward. Accordingly, for example, in a vehicle type in which two vehicle driving apparatuses are symmetrically arranged in the left-right direction as shown in FIG. 6, the vehicle driving apparatus 1 can be used in common for the two vehicle driving apparatuses. Further, the vehicle driving apparatus 1 can be used in common for a plurality of vehicle types having different attachment spaces, such as a vehicle type in which an attachment space of a vehicle driving apparatus is provided on the left side of the vehicle and a vehicle type in which an attachment space of a vehicle driving apparatus is provided on the right side of the vehicle. Accordingly, the versatility of the vehicle driving apparatus 1 is improved.

Further, the discharge port 25 is provided in a central portion between the first end surface 27 and the second end surface 28 in the axial direction, and the distance D1 from the first end surface 27 to the center of the discharge port 25 in the axial direction is equal to the distance D2 from the second end surface 28 to the center of the discharge port 25 in the axial direction (see FIG. 4). Accordingly, the oil pump 4 can be positioned relative to the rotating shaft 3 such that the discharge port 25 overlaps the supply groove 32 by merely causing the first end surface 27 to abut against the housing-side fixing portion (fixing boss 12A) and causing the second end surface 28 to abut against the housing-side fixing portion (fixing boss 12B) regardless of whether the vehicle driving apparatus 1 is vertically reversed.

Another method may be used in relation to the positioning of the oil pump 4 relative to the rotating shaft 3. As shown in FIG. 7, a distance from the first end surface 27 to a proximal end of the discharge port 25 along the axial direction is defined as A1, and a distance from the first end surface 27 to a distal end of the discharge port 25 along the axial direction is defined as A2. As shown in FIG. 8, a distance from the second end surface 28 to a proximal end of the discharge port 25 along the axial direction is defined as B1, and a distance from the second end surface 28 to a distal end of the discharge port 25 along the axial direction is defined as B2. The proximal end of the discharge port 25 as viewed from the first end surface 27 is the distal end of the discharge port 25 as viewed from the second end surface 28, and the distal end of the discharge port 25 as viewed from the first end surface 27 is the proximal end of the discharge port 25 as viewed from the second end surface 28. When a distance from an abutting surface of the housing-side fixing portion (fixing bosses 12A and 12B) abutting against the first end surface 27 and the second end surface 28 to the proximal end of the supply groove 32 along the axial direction is defined as C1 and a distance from an abutting surface 13 to the distal end of the supply groove 32 along the axial direction is defined as C2, $C1 \leq A1 < A2 \leq C2$ (see FIG. 7) and $C1 \leq B1 < B2 \leq C2$ (see FIG. 8) are satisfied. Accordingly, the oil pump 4 can be positioned relative to the rotating shaft 3 such that the entire discharge port 25 overlaps the supply groove 32 by merely causing the first end surface 27 to abut against the housing-side fixing portion (fixing boss 12A) and causing the second end surface 28 to abut against the housing-side fixing portion (fixing boss 12B) regardless of whether the vehicle driving apparatus 1 is vertically reversed.

Figure 9:
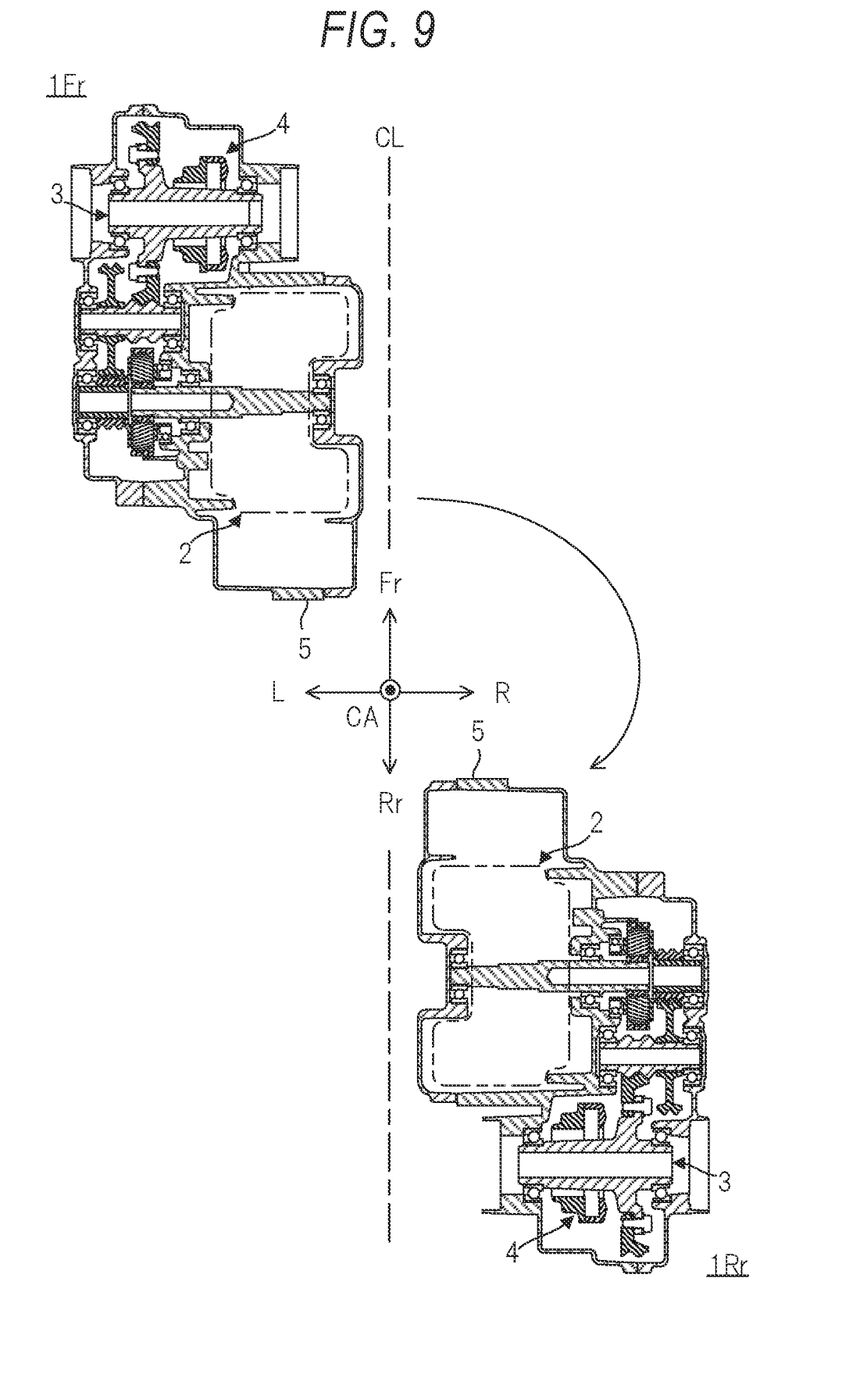
FIG. 9 is another conceptual diagram illustrating the operation of the vehicle driving apparatus in FIG. 1.

FIG. 9 shows an arrangement example of the vehicle driving apparatus 1 different from that in FIG. 6.

The arrangements are also adopted in which the vehicle driving apparatus 1 may be rotated by 180° about a center axis CA extending in, for example, the vertical direction through the center of the vehicle in the front-rear direction (Fr-Rr) and the left-right direction (L-R) of the vehicle, so that the entire device is reversed in the front-rear direction (hereinafter referred to as front-rear reversal) and the devices are arranged in the front-rear direction. For example, the front wheels of the vehicle can be driven by a front vehicle driving apparatus 1Fr, and the rear wheels of the vehicle can be driven by a rear vehicle driving apparatus 1Rr. In this case, a rotation direction of the rotating shaft 3 of the front vehicle driving apparatus 1Fr during forward movement is opposite to a rotation direction of the rotating shaft 3 of the rear vehicle driving apparatus 1Rr during forward movement. That is, the rotation direction during the forward movement when the front vehicle driving apparatus 1Fr is viewed from the center line CL extending in the front-rear direction of the vehicle is clockwise, and the rotation direction during the forward movement when the rear vehicle driving apparatus 1Rr is viewed from the center line CL is counterclockwise. Here, in a case where the oil pump 4 (the rotor 20 of the oil pump 4) is capable of sucking and sending out the oil only by rotation in one direction, as shown in FIGS. 7 and 8, the first end surface 27 and the second end surface 28 of the oil pump 4 are reversed and mounted on the housing 5, or the vehicle driving apparatus 1 is reversed in the front-rear direction except for the oil pump 4 when the vehicle driving apparatus 1 is reversed in the front-rear direction, so that the oil can be sucked and sent out in both the front vehicle driving apparatus 1Fr and the rear vehicle driving apparatus 1Rr. At this time, regardless of the front-rear reversal of the vehicle driving apparatus 1, the oil pump 4 is disposed inside the housing 5 such that the strainer 24 faces downward. Accordingly, in a vehicle type in which two vehicle driving apparatuses are symmetrically arranged with respect to the center axis CA, the vehicle driving apparatus 1 can be used in common for the two vehicle driving apparatuses, and the versatility of the vehicle driving apparatus 1 is improved.

Figure 10:
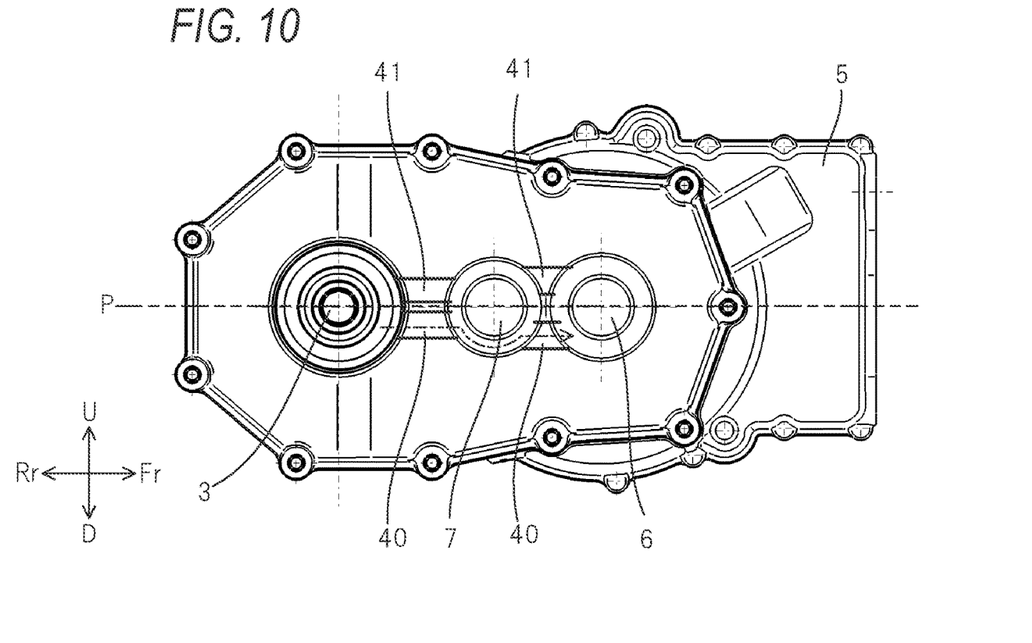
FIG. 10 is a view showing a modification of the vehicle driving apparatus in FIG. 1.
Figure 11:
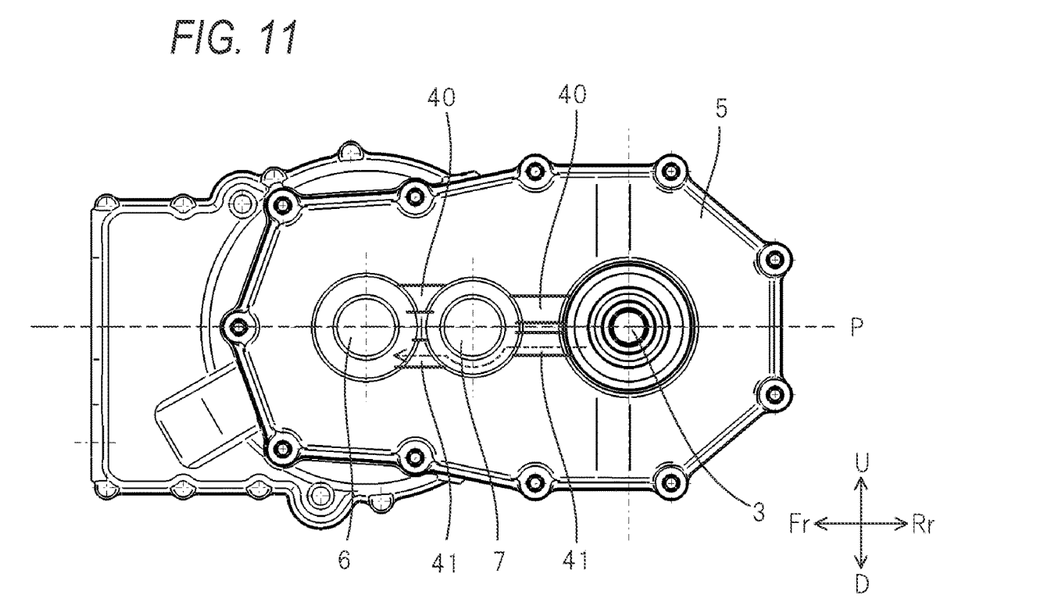
FIG. 11 is a view showing a modification of the vehicle driving apparatus in FIG. 1.

FIGS. 10 and 11 show modifications of the vehicle driving apparatus 1.

In the example shown in FIGS. 10 and 11, the oil sent out from the oil pump 4 is also supplied to bearings that rotatably support the intermediate transmission shafts 6 and 7. The rotating shaft 3 and the intermediate transmission shafts 6 and 7 are arranged on the same horizontal plane P, and a first flow path 40 and a second flow path 41 are provided on an outer wall of the housing 5 symmetrically with respect to the horizontal plane P. The first flow path 40 and the second flow path 41 are connected to the internal flow path 31 of the rotating shaft 3, and the oil sent out from the oil pump 4 flows.

FIG. 10 shows an arrangement of the right vehicle driving apparatus 1R for driving the wheels on the right side of the vehicle in FIG. 6 as viewed from the right side of the vehicle, and FIG. 11 shows an arrangement of the left vehicle driving apparatus 1L for driving the wheels on the left side of the vehicle in FIG. 6 as viewed from the left side of the vehicle. In the arrangement shown in FIG. 10, the oil sent out from the oil pump 4 is supplied to the bearings of the intermediate transmission shafts 6 and 7 through the first flow path 40 positioned below of the first flow path 40 and the second flow path 41. In the arrangement shown in FIG. 11, the vertical positional relationship between the first flow path 40 and the second flow path 41 is reversed in accordance with the vertical reversal of the vehicle driving apparatus 1, and the oil sent out from the oil pump 4 is supplied to the bearings of the intermediate transmission shafts 6 and 7 through the second flow path 41 positioned below of the first flow path 40 and the second flow path 41.

FIG. 12 and FIGS. 13A to 13E show another example of the vehicle driving apparatus in a side view. The same elements as those of the above-described vehicle driving apparatus 1 are denoted by the same reference numerals, and the description thereof will be simplified or omitted.

Figure 12:
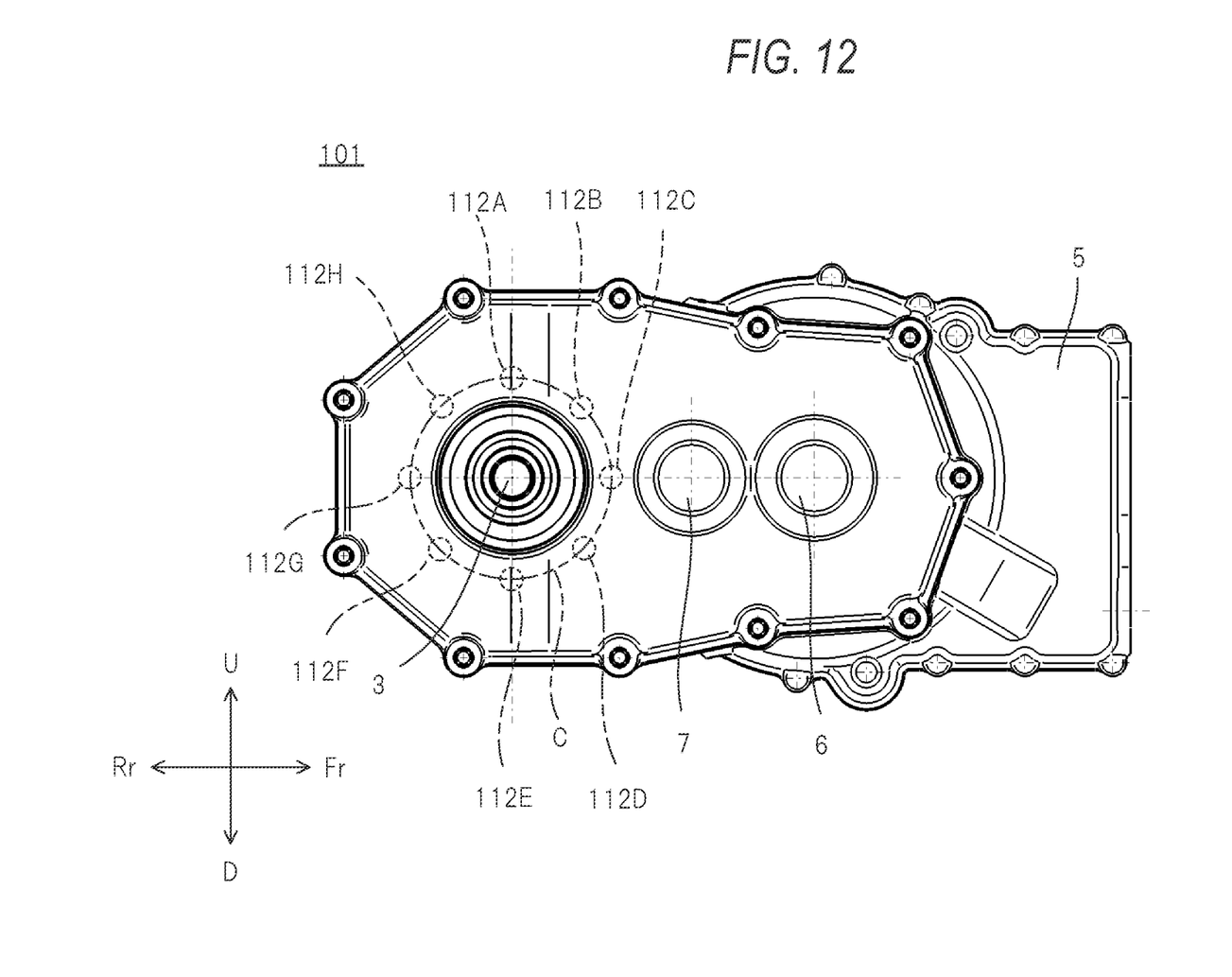
FIG. 12 is a view showing another example of the vehicle driving apparatus, which illustrates the embodiment of the present invention.

A vehicle driving apparatus 101 shown in FIG. 12 includes a plurality of fixing bosses 112 as housing-side fixing portions that abut against the case-side fixing portion 26 of the oil pump 4. Other configurations are the same as those of the above-described vehicle driving apparatus 1. The fixing bosses 112 are arranged at intervals on a circumference C concentric with the rotating shaft 3. In the example shown in FIG. 12, eight fixing bosses 112A to 112H are arranged at intervals of 45° in terms of the angle around the center axis of the rotating shaft 3. The case-side fixing portion 26 of the oil pump 4 is fixed to one fixing boss 112 selected from the plurality of fixing bosses 112A to 112H inside the housing 5.

In the vehicle driving apparatus 101 configured as described above, similarly to the above-described vehicle driving apparatus 1, the oil pump 4 can also be mounted on the rotating shaft 3 disposed symmetrically in the left-right direction when the vehicle driving apparatus 101 is vertically reversed. Further, as shown in FIGS. 13A to 13E, an arrangement can be adopted in which the vehicle driving apparatus 101 is rotated about the rotating shaft 3 so that the entire device is inclined relative to the horizontal direction. The inclination angle is set corresponding to one fixing boss 112 selected from the fixing bosses 112A to 112H.

Figure 13:
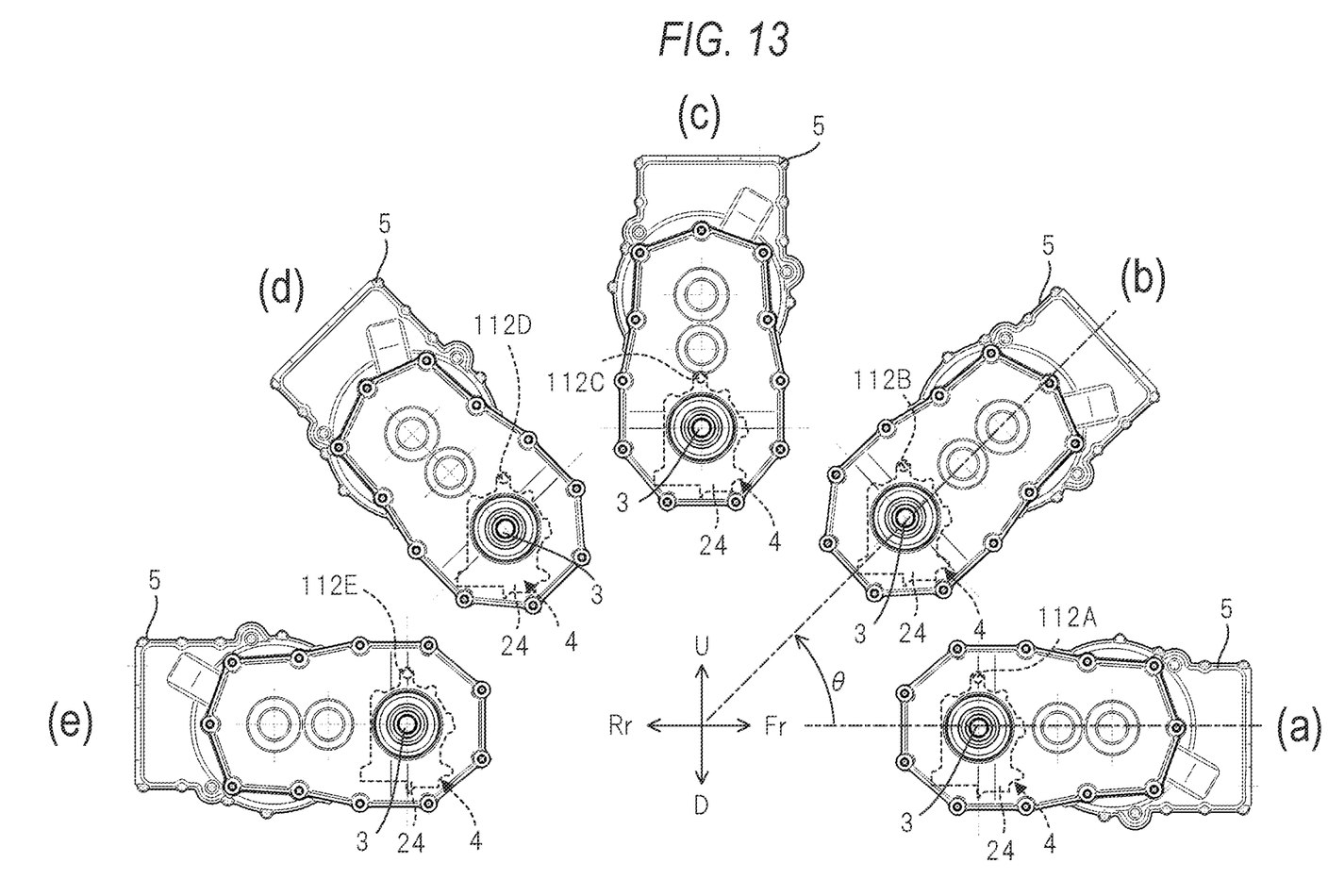
FIG. 13 is a conceptual diagram illustrating an operation of the vehicle driving apparatus in FIG. 12.

For example, FIG. 13A shows a case where the fixing boss 112A is selected, and the inclination angle θ of the vehicle driving apparatus 101 relative to the horizontal direction is set to 0°. The case-side fixing portion 26 of the oil pump 4 is fixed to the fixing boss 112A, and the oil pump 4 is disposed inside the housing 5 such that the strainer 24 faces downward.

FIG. 13B shows a case where the fixing boss 112B is selected, and the inclination angle θ of the vehicle driving apparatus 101 relative to the horizontal direction is set to 45°. The case-side fixing portion 26 of the oil pump 4 is fixed to the fixing boss 112B, and the oil pump 4 is disposed inside the housing 5 such that the strainer 24 faces downward.

FIG. 13C shows a case where the fixing boss 112C is selected, and the inclination angle θ of the vehicle driving apparatus 101 relative to the horizontal direction is set to 90°. The case-side fixing portion 26 of the oil pump 4 is fixed to the fixing boss 112C, and the oil pump 4 is disposed inside the housing 5 such that the strainer 24 faces downward.

FIG. 13D shows a case where the fixing boss 112D is selected, and the inclination angle θ of the vehicle driving apparatus 101 relative to the horizontal direction is set to 135°. The case-side fixing portion 26 of the oil pump 4 is fixed to the fixing boss 112D, and the oil pump 4 is disposed inside the housing 5 such that the strainer 24 faces downward.

FIG. 13E shows a case where the fixing boss 112E is selected, and the inclination angle θ of the vehicle driving apparatus 101 relative to the horizontal direction is set to 180°. The case-side fixing portion 26 of the oil pump 4 is fixed to the fixing boss 112E, and the oil pump 4 is disposed inside the housing 5 such that the strainer 24 faces downward.

In the case where the vehicle driving apparatus 101 is disposed symmetrically in the left-right direction with respect to the arrangement in FIG. 12 by turning the vehicle driving apparatus 101 upside down except for the oil pump 4, any one of the fixing bosses 112E, 112F, 112G, 112H, and 112A is selected, and the inclination angle of the vehicle driving apparatus 101 is set to 0°, 45°, 90°, 135°, and 180°. The oil pump 4 is fixed to the selected fixing boss, so that the oil pump 4 is disposed inside the housing 5 such that the strainer 24 faces downward.

In this way, regardless of the inclination of the vehicle driving apparatus 101, the oil pump 4 is fixed to the selected fixing boss 112, and is disposed inside the housing 5 such that the strainer 24 faces downward. Accordingly, the versatility of the vehicle driving apparatus 1 is further improved.

The housing-side fixing portion may be formed in an annular shape concentric with the rotating shaft 3. Accordingly, the case-side fixing portion 26 can be fixed to any part of the annular housing-side fixing portion in the circumferential direction, and the degree of freedom of the inclination angle of the vehicle driving apparatus 101 can be increased.

What is claimed is:
1. A vehicle driving apparatus comprising:
a power source;
a rotating shaft driven by the power source;
a fluid pump driven by the rotating shaft; and
a housing accommodating the power source, the rotating shaft, and the fluid pump,
wherein the fluid pump includes:
a rotor that includes a shaft hole through which the rotating shaft is to be inserted and that is rotated by the rotating shaft inserted through the shaft hole; and
a case that accommodates the rotor and includes an insertion hole through which the rotating shaft is to be inserted, the insertion hole being a hole continuous with the shaft hole of the rotor,
the case includes a discharge port configured to allow a fluid to be discharged therethrough, and the discharge port is provided on an inner peripheral surface of the insertion hole,
the rotating shaft includes:
an attachment portion fittable to the shaft hole; and
an internal flow path configured to allow the fluid to flow therethrough,
a supply groove is provided on an outer peripheral surface of the rotating shaft, and the supply groove communicates with the internal flow path,
the fluid pump is attached to the attachment portion of the rotating shaft such that positions of the discharge port and the supply groove in an axial direction of the rotating shaft overlap each other, and
the attachment portion is provided on each of both sides of the supply groove in the axial direction.

2. The vehicle driving apparatus according to claim 1,
wherein the housing includes a housing-side fixing portion, and the case includes a case-side fixing portion to be fixed to the housing-side fixing portion,
the case-side fixing portion has a first end surface on one side and a second end surface on the other side in the axial direction, and the first end surface and the second end surface are abuttable against the housing-side fixing portion in the axial direction,
the discharge port is provided in a middle between the first end surface and the second end surface, and
the discharge port and the supply groove face each other.

3. The vehicle driving apparatus according to claim 2,
wherein a distance from the first end surface to a center of the discharge port along the axial direction is equal to a distance from the second end surface to the center of the discharge port along the axial direction.

4. The vehicle driving apparatus according to claim 3,
wherein the housing-side fixing portion includes a plurality of fixing bosses,
the plurality of fixing bosses are arranged at intervals on a circumference concentric with the rotating shaft, and
the case-side fixing portion is fixed to one fixing boss selected from the plurality of fixing bosses.

5. The vehicle driving apparatus according to claim 3,
wherein the housing-side fixing portion is formed in an annular shape concentric with the rotating shaft, and
the case-side fixing portion is fixed to any part of the housing-side fixing portion in a circumferential direction.

6. The vehicle driving apparatus according to claim 1,
wherein the housing includes a housing-side fixing portion, and the case includes a case-side fixing portion to be fixed to the housing-side fixing portion,
the case-side fixing portion has a first end surface on one side and a second end surface on the other side in the axial direction, and the first end surface and the second end surface are abuttable against the housing-side fixing portion in the axial direction, and
$C1 \leq A1 < A2 \leq C2$ and $C1 \leq B1 < B2 \leq C2$ are satisfied, in which
A1 represents a distance from the first end surface to a proximal end of the discharge port along the axial direction,
A2 represents a distance from the first end surface to a distal end of the discharge port along the axial direction,
B1 represents a distance from the second end surface to a proximal end of the discharge port along the axial direction,
B2 represents a distance from the second end surface to a distal end of the discharge port along the axial direction,
C1 represents a distance from an abutting surface of the housing-side fixing portion abutting against the first end surface and the second end surface to a proximal end of the supply groove along the axial direction, and
C2 represents a distance from the abutting surface of the housing-side fixing portion to a distal end of the supply groove along the axial direction.

7. The vehicle driving apparatus according to claim 6,
wherein the housing-side fixing portion includes a plurality of fixing bosses,
the plurality of fixing bosses are arranged at intervals on a circumference concentric with the rotating shaft, and
the case-side fixing portion is fixed to one fixing boss selected from the plurality of fixing bosses.

8. The vehicle driving apparatus according to claim 6,
wherein the housing-side fixing portion is formed in an annular shape concentric with the rotating shaft, and
the case-side fixing portion is fixed to any part of the housing-side fixing portion in a circumferential direction.

* * * * *